(12) United States Patent
Kleinsasser

(10) Patent No.: US 7,225,755 B2
(45) Date of Patent: Jun. 5, 2007

(54) HOG PRODUCTION MANAGEMENT BY WEIGHT

(75) Inventor: Jonathan Kleinsasser, St. Agathe (CA)

(73) Assignee: Crystal Spring Colony Farms Ltd., Ste. Agathe, Manitoba. (CA)

( * ) Notice: Subject to any disclaimer, the term of this patent is extended or adjusted under 35 U.S.C. 154(b) by 92 days.

(21) Appl. No.: 11/131,343

(22) Filed: May 18, 2005

(65) Prior Publication Data

US 2006/0260561 A1    Nov. 23, 2006

(51) Int. Cl.
*A01J 3/00*    (2006.01)
(52) U.S. Cl. .............................. 119/14.02; 119/14.08; 119/14.18; 119/51.02
(58) Field of Classification Search ............. 119/14.02, 119/14.08, 14.18, 51.02, 712
See application file for complete search history.

(56) References Cited

U.S. PATENT DOCUMENTS

| | | | | |
|---|---|---|---|---|
| 4,280,448 A | * | 7/1981 | Ostermann | 119/842 |
| 5,816,191 A | * | 10/1998 | Beaudoin et al. | 119/57.92 |
| 6,837,189 B2 | | 1/2005 | Schick | |
| 2003/0192487 A1 | * | 10/2003 | Zimmerman | 119/842 |

FOREIGN PATENT DOCUMENTS

WO    WO 03/103380    12/2003

* cited by examiner

*Primary Examiner*—Teri Pham Luu
*Assistant Examiner*—Willie Berry, Jr.
(74) *Attorney, Agent, or Firm*—Adrian D. Battison; Michael R. Williams; Ryan W. Dupuis

(57) ABSTRACT

In a hog production plant the hogs are divided into a series of separate pens within the hog plant based generally on weight such that the lightest hogs closest to the initial weight are arranged in the first pen when the arrive and the heaviest hogs closest to the final market weight are arranged in the last pen. Each pen includes a sorting scale arranged to receive a hog therein and to weigh the hog for selection of one of two outlet paths leading to the next pen of the series or, in respect of the last pen, to a discharge location. A control unit for the system is arranged such that a required number of hogs to be removed from the last of the pens for market, the required number being less than the total number of hogs in the last pen and less than the total number of hogs in each of the other pens of the series is set and the sorter operated to remove the required number of hogs from the last pen and to transfer from each pen to the next of the series substantially the same number so as to maintain the numbers of hogs in the pens substantially constant.

12 Claims, 1 Drawing Sheet

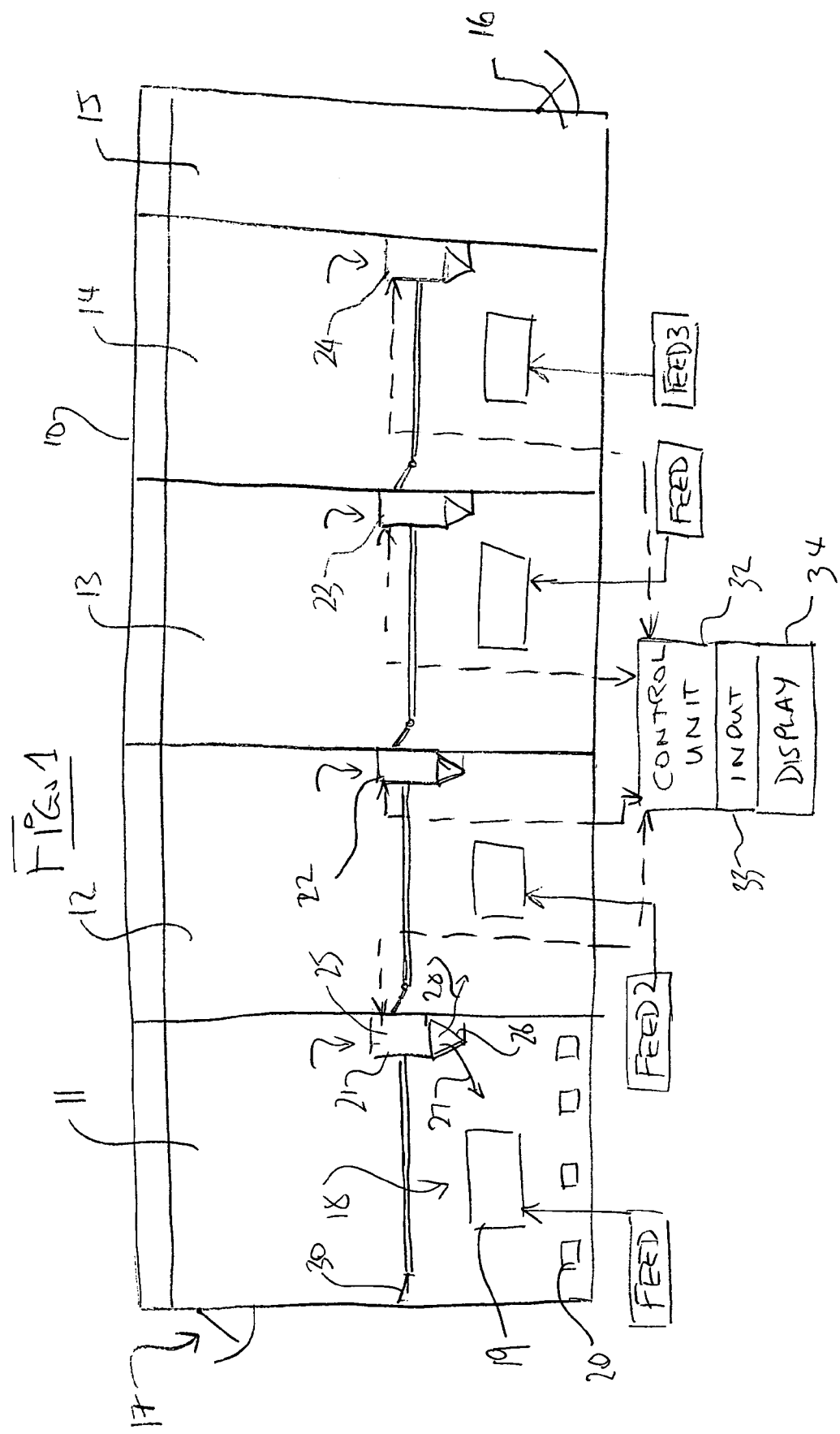

HOG PRODUCTION MANAGEMENT BY WEIGHT

This invention relates to a method and apparatus for managing the growth of hogs in pens by weight.

BACKGROUND OF THE INVENTION

Procedures in hog production are improved and modified on an ongoing basis for the purposes of improving feed uptake efficiency and of improving the quality of life for the animals.

In recent years the production has been divided into separate sections with production barns dedicated to the separate sections rather than to the full life scale of the animal. One of these sections is the finisher section in which the animals are taken after weaning and after an initial growth stage and are then brought from the initial weight of the order of 60 lbs up to a market weight of the order of 250 lbs.

One technique which has been proposed recently is that of maintaining the hogs in a series of pens in the finisher barn in which animals of approximately the same weight are maintained in a common pen and then moved from that pen to the next pen.

In large scale production each pen could include 500 individual animals as a typical number with the range being of the order of 200 to 600. It will be appreciated that individual management of that number of hogs in a pen and management of transfer of that number of hog from one pen to the next is a difficult situation which is beyond the individual control of an operator observing the animals.

Sorting scales have been available in recent years which are used to weigh individual animals and, based upon the weight being above or below a certain value to guide the animal as it exits from the scale to one path or another. In this way the heavier animals can be selected and directed to a separate pen for example in a market situation to determine when the animals reach market weight. Such sorting scales have become widely used.

It has also been hypothesised that the animals can be managed, depending upon their weight to supply different types of feed materials so as to encourage rapid growth in animals which are growing less effectively or to provide a lower cost of feed for animals which are growing most effectively. If all the animals grew at the same rate, transfer of the animals through the pens would be relatively straight forward since all of the animals at a certain age would be moved. However unfortunately, for various reasons animals do not grow at the same rate and up till now their individuality has been difficult to manage.

One attempt to manage hogs within a hog barn is shown in U.S. Pat. No. 6,837,189 (Schick) issued Jan. 4, 2005. This provides an arrangement in which animals are sorted between light and heavy into two separate pens using a sorting scale. However this provides no system for controlling the density of animals within a particular pen.

Also published International application WO03/103380 (Thibault) assigned to Osborne Industries Inc and published Dec. 18, 2003 discloses a system of dividing animals into heavy weight pen and a lightweight pen using a sorting scale. However again it does not consider the issues of animal density within the pens.

SUMMARY OF THE INVENTION

It is one object of the invention to provide a method and apparatus for managing hogs in separate pens in a hog plant.

According to one aspect of the invention there is provided a method of managing hogs in a hog plant as they grow from an initial weight to a final weight comprising:

providing a series of separate pens within the hog plant from a first of the series through one or more intermediate pens of the series to a last of the series;

dividing the hogs in the hog plant into the series of separate pens based generally on weight such that the lightest hogs closest to the initial weight are arranged in the first pen and the heaviest hogs closest to the final weight are arranged in the last pen;

providing for each pen a respective sorting scale arranged to receive a hog therein and to weigh the hog located within the scale;

the sorting scales having a plurality of outlet paths for the weighed hog which can be selected by the sorting scale, one of the paths leading to the next pen of the series or, in respect of the last pen, to a discharge location;

arranging the sorting scales such that the hogs in the respective pen periodically enter and leave the sorting scale to be weighed therein;

pre-determining a required number of hogs to be removed from the last of the pens, the required number being less than the total number of hogs in the last pen and less than the total number of hogs in each of the other pens of the series;

and controlling the sorting scales of the series of pens to remove the required number of hogs from the last pen and to transfer from each pen to the next of the series a respective transfer number of hogs, which transfer numbers are substantially equal to the required number, so as to maintain the numbers of hogs in the pens substantially constant.

The number of hogs selected to be extracted is generally a truck load to be transported to market, but this is not essential.

Preferably the sorting scales in the respective pen are operated to select from the hogs passing therethrough those which are above a weight calculated for the respective pen until a number of hogs equal to the respective transfer number has been transferred.

Preferably the calculated weight is determined from data obtained from the weight of the hogs as they periodically enter and leave the sorting scale.

Preferably the calculated weight is arranged such that the number of hogs in the respective pen which are above the calculated weight is greater than the respective transfer number.

Preferably the transfer numbers are equal and equal to the required number. However it will be appreciated that the numbers may differ slightly for reasons of managing the numbers in certain pens with the intention that the overall numbers are maintained consistent over an extended period. In this way the density of hogs in the pens can be maintained consistent to avoid overcrowding at certain times which can lead to stress and aggression.

It is desirable that an arrangement of the sorter scale be provided which leads to all or substantially all of the hogs passing through to be weighed. On way to achieve this is to provide in each pen a feed court and the feed court is arranged in the pen such that the hogs are obliged to pass through the sorter scale on their way to the feed court. This may have the disadvantage that certain hogs are resistant to passing through the scale and thus may be reluctant to eat their full share of feed or to eat at all. This of course is disadvantageous since the intention is to maximize weight gain.

In another arrangement, each pen includes a water court and the water court is arranged in the pen such that the hogs are obliged to pass through the sorter scale on their way to the water court. This reduces the feeding problem and allows feeders to be placed at locations and in arrangements which are more accessible to the hogs and les stressful to the weaker or less dominant hogs.

In a yet further alternative, the sorter scale is arranged such that the hogs can enter and leave the sorter scale at their own volition. In many cases the hogs are sufficiently curious and adventurous that they will pass through voluntarily.

However to account for less adventurous animals there may be provided an arrangement of dividers in the respective pen for driving all of the hogs through the sorter scale when the operator chooses to do so.

Preferably the sorter scales are connected to a central control and wherein the central control automatically controls the sorter scales to transfer the hogs when the hogs are removed from the last pen. However the same arrangement may be controlled manually by the operator who sets required transfer numbers n the individual scales.

This method has particular advantage in a situation where at least one of the pens is arranged such that feed stations therein provide different feed rations from at least one other of the pens. Thus the operator can manage feed usage and cost by serving a lower cost feed to animals in certain weight ranges and/or a higher cost feed to animals in other weight ranges. This is particularly applicable in the last range close to market where a feed may be supplied which reduces fat content in the market animal. However in other cases, animals which are gaining more slowly may be advanced by serving a higher nutrition feed, often at higher cost.

In one preferred mode of operation, after a number of cycles of periodically discharging all hogs from the last pen and transferring all from each pen to the next.

According to a second aspect of the invention there is provided an apparatus for weighing and sorting hogs in a hog plant as they grow from an initial weight to a final weight wherein the hog plant provides a series of separate pens within the hog plant from a first of the series through one or more intermediate pens of the series to a last of the series such that the hogs are divided in the hog plant into the series of separate pens based generally on weight such that the lightest hogs closest to the initial weight are arranged in the first pen and the heaviest hogs closest to the final weight are arranged in the last pen, the apparatus comprising:

a plurality of individual sorting scales each arranged to receive a hog therein and to weigh the hog located within the scale;

the sorting scales being arranged to control a plurality of outlet paths for the weighed hog which can be selected by the sorting scale;

the sorting scales being arranged such that each can be located in a respective one of the pens for weighing and sorting the hogs therein;

and a control unit for communicating to and controlling the separate sorter scales;

the control unit being arranged to operate the sorting scale in the last pen to sort a pre-determined required number of hogs to be removed from the last pen;

and the control unit being arranged to operate the sorting scales of the other pens of the series of pens to transfer from each pen to the next of the series a respective transfer number of hogs, which transfer numbers are substantially equal to the predetermined required number, so as to maintain the numbers of hogs in the pens substantially constant.

BRIEF DESCRIPTION OF THE DRAWINGS

One embodiment of the invention will now be described in conjunction with the accompanying drawings in which:

FIG. 1 is a schematic plan view of a hog production facility divided into a series of separate pens and using a sorting scale in each pen to transfer hogs from one pen to the next.

In the drawings like characters of reference indicate corresponding parts in the different figures.

DETAILED DESCRIPTION

In FIG. 1 is shown a plan view of a hog production facility contained in a single barn 10. The barn is of a conventional construction with the necessary facilities including removal of waste materials from an underfloor system and air ventilation. The barn is intended as a finisher barn so that animals will enter the barn generally at a weight of the order of 60 lbs. and will leave the barn at market weight.

The barn is divided into a number of pens which in the example shown is four pens 11, 12, 13 and 14 together with a final holding pen 15 which is used temporarily to house animals prior to departure to market through an outlet door 16. Animals enter the system through an inlet door 17. The pens are divided each from the next by a dividing fence of suitable structure well known to one skilled in the art so that the animals cannot themselves transfer from one pen to the next.

In the embodiment shown the pen includes a separate feed court 18 at one part of the pen containing feed dispensing systems 19 and water dispensing systems 20. Thus the animals in the example shown are obliged to enter the feed court periodically at their own volition through a sorting scale 21. Thus the pen 11 includes a first sorting scale 21, the pen 12 includes a sorting scale 22, the pen 13 includes a sorting scale 23 and the pen 14 includes a sorting scale 24.

Each of these sorting scales has a weigh pan which weighs the animal when contained within the scale and a front door 26 which can be moved to one direction or the other to allow the animal to exit through a first outlet 27 or a second outlet 28 depending upon the operation of the scale and the measured weight of the animal within the scale.

Scales of this type are well known and manufactured by a number of different manufacturers and are well known to one skilled in the art. Generally the animal enters at the rear and exits from the front. Generally the device includes front and rear doors which control the animal within the scale so that the animal when standing on the weigh pan 25 is weighed without interference from other animals attempting to enter or leave. Thus the animal entering the sorting scale can either pass into the feed court of the respective pen or can be discharged into the next adjacent in the series in dependence upon the position of the door 26.

The feed court is separated from the pen by a one way gate 30 so that the animals are obliged to pass through the sorting scale each time they wish to enter the food court.

This arrangement described above is only one possible arrangement of the sorting scale and another arrangement can provide the sorting scale at a position separated from the remaining area of the pen by only a water court with the feed being provided more freely to the animals in the main area of the pen.

In a yet further example, the sorting scale may be positioned simply at a location within the whole pen with no division so that the animals can pass through the sorting scale at their own volition, bearing in mind that hogs are generally curious and happy to explore within the area available to them.

All of these arrangements have some disadvantage in that some animals are reluctant to pass into the scale because they are particularly unadventurous and hence the systems which use food or water as an incentive may inhibit the animal from eating or taking water thus reducing the efficiency of food uptake. If the sorter is merely placed in the general population some animals may never pass through.

A yet further arrangement therefore provides a series of forcing pens or walls within the pen by which the animals can be gradually forced through from one side to the other side by the operator moving the walls to ensure that all animals pass through at one time.

The continual pass through of the animals through the sorting scale provides an indication of the weight of each animal as it passes through so that information can be provided from the sorting scale to a central control unit 32.

The initial intention with the arrangement described above does not require the use of individual identifying tags for each of the animals so that the information communicated to the control unit from each sorting scale does not identify the animal. However the system can also be used with identifying tags so that the central control unit has complete data on each animal and its current weight in relation to previous weights.

In the arrangement without identifying tags, it is not possible to determine which animals pass through more than once in a particular time period so that data relating to the average weight of the animals within the pen, the heaviest weight of the animals within the pen, the lightest weight of animals in the pen and the statistical differences between the animals in the pen is not completely accurate but provides guidance as to this information which can be used to control the sorting of the animals into the individual pens.

The control unit 32 includes an input 33 which can be operated by the operator to provide instructions or query the control unit in a conventional manner. The control unit further includes a display 34 so that the operator can interact with the control unit using the input and the display using conventional operating techniques well known for electronic equipment of this type.

In particular the control unit can be actuated to operate the sorting scale 24 to extract from the pen 14 animals which are intended for market. Thus the control unit can be actuated by the operator to indicate the number of animals to be selected. The operator can himself from data available on the display select a weight above which the animals are intended to be sorted into the temporary discharge pen 15. This weight is selected based upon the average weight of the animals within the pen 14, the maximum or heaviest weight of animals within the pen 14 and the statistics of the differences between the animals.

The separating weight which is selected can be set either by the control unit itself using the data received from the sorting scale 24 or can be set by the operator.

The separating weight is a weight determined for the sorting scale so that animals above that weight are transferred through the path into the pen 15 and animals below that weight are separated back into the pen 14. The weight is selected such that there are more animals within the pen 14 which are above the selected weight than is the number which is intended to be separated for the pen 15. Thus the sorting scale operates to extract from the pen 14 the first number of animals which is equal to the required number for the pen 15 and after that number has been extracted all remaining animals regardless of their weight are transferred back to the pen 14.

After operation of the control unit to select and extract the animal for the pen 15, the control unit is operated to provide a signal to each of the sorting scales 23, 22 and 21 to extract from the respective pen and transfer to the next pen in the series a transfer number of animals which is exactly equal to or approximately equal to the number extracted from the pen 14.

Thus again each sorting scale is operated with a transfer number to be transferred of the animals and also a selected weight to extract animals above that weight. Again the selected weight is such that some animals will remain in the pen concerned which are above that weight because they are not the first animals to be selected.

It has been found that this system operates to properly maintain the density of animals within each of the pens but that the statistical operation ensures that animals are transferred from each pen to the next over a number of cycles of the system to keep the animals within the weight pen. In this way lighter animals which are not gaining at a sufficient rate remain back within the primary pen and are not transferred to the next pen in the series. In this way different feeds can be provided to the animals as indicated at feed, feed 2 and feed 3. These feeds can be selected in accordance with cost and nutritional value so as to ensure that the animals receive the best feed for the most economic feed uptake. Thus lighter animals may receive a higher nutrition feed in order to advance their weight gain. Thus in addition the animals close to market may be given a feed selected to reduce fat so that the final growth stage is leaner.

The arrangement therefore provides a simple control for the large number of animals in the system which can be in the range 1000 to 3000 with the animals divided in approximately equally into the individual pens. The statistical control of the animals provides an improved economy of feed uptake based upon the selection of suitable value feeds depending upon the weight of the animal.

The system ensures that animals are transferred from one pen to next in groups rather than individually. Transfer of individual animals from a first pen to a second pen can lead to aggression and fighting. It is well known that transferring a number of animals in quick sequential operation avoids or reduces such aggression when the animals reach the new group of animals to which they are to be housed in the new pen.

The system ensures that the density of animals within the pen is maintained substantially constant without overcrowding in some times since overcrowding can again lead to aggression and stress which reduces feed uptake.

In order to ensure that some animals do not remain in the first pen without moving to the next pen due to their reluctance to enter the scale or merely because of statistical accident, the system is operated so that after a number of cycles of extraction and transfer of animals, the whole of the animals within the pen 14 are transferred as the pen 14 into a holding pen thus allowing the pen 14 to be effectively cleaned while it is entirely empty of animals. In this cycle, therefore, after the pen 14 is cleaned, the animals from the pen 13 are all moved to the pen 14 and the pen 13 is cleaned. This operation is then repeated through the whole system so that each pen is properly cleaned and it ensures at the same time that the animals are transferred from one pen to the next without possibility of remaining forever in the lightweight pen.

While the arrangement is shown as being an automatic arrangement controlled by the control until, it is also possible that the operator can individually set the required numbers and weights on the individual sorters themselves without any central control unit.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method of managing hogs in a hog plant as they grow from an initial weight to a final weight comprising:

provceding a series of separate pens within the hog plant from a first of the series through one or more intermediate pens of the series to a last of the series;

dividing the hogs in the hog plant into the series of separate pens based generally on weight such that the lightest hogs closest to the initial weight are arranged in the first pen and the heaviest hogs closest to the final weight are arranged in the last pen;

providing for each pen a respective sorting scale arranged to receive a hog therein and to weigh the hog located within the scale;

the sorting scales having a plurality of outlet paths for the weighed hog which can be selected by the sorting scale, one of the paths leading to the next pen of the series or, in respect of the last pen, to a discharge location;

arranging the sorting scales such that the hogs in the respective pen periodically enter and leave the sorting scale to be weighed therein;

pre-determining a required number of hogs to be removed from the last of the pens, the required number being less than the total number of hogs in the last pen and less than the total number of hogs in each of the other pens of the series;

and controlling the sorting scales of the series of pens to remove the required number of hogs from the last pen and to transfer from each pen to the next of the series a respective transfer number of hogs, which transfer numbers are substantially equal to the required number, so as to maintain the numbers of hogs in the pens substantially constant.

2. The method according to claim 1 wherein the sorting scales in the respective pen are operated to select from the hogs passing therethrough those which are above a weight calculated for the respective pen until a number of hogs equal to the respective transfer number has been transferred.

3. The method according to claim 2 wherein the calculated weight is determined from data obtained from the weight of the hogs as they periodically enter and leave the sorting scale.

4. The method according to claim 2 wherein the calculated weight is arranged such that the number of hogs in the respective pen which are above the calculated weight is greater than the respective transfer number.

5. The method according to claim 1 wherein the transfer numbers are equal and equal to the required number.

6. The method according to claim 1 wherein each pen includes a feed court and wherein the feed court is arranged in the pen such that the hogs are obliged to pass through the sorter scale on their way to the feed court.

7. The method according to claim 1 wherein each pen includes a water court and wherein the water court is arranged in the pen such that the hogs are obliged to pass through the sorter scale on their way to the water court.

8. The method according to claim 1 wherein the sorter scale is arranged such that the hogs can enter and leave the sorter scale at their own volition.

9. The method according to claim 8 wherein there is provided an arrangement of dividers in the respective pen for driving all of the hogs through the sorter scale.

10. The method according to claim 1 wherein the sorter scales are connected to a central control and wherein the central control automatically controls the sorter scales to transfer the hogs when the hogs are removed from the last pen.

11. The method according to claim 1 wherein at least one of the pens is arranged such that feed stations therein provide different feed rations from at least one other of the pens.

12. The method according to claim 1 including periodically discharging all hogs from the last pen and transferring all from each pen to the next.

* * * * *